United States Patent [19]

Yamada et al.

[11] 4,197,679
[45] Apr. 15, 1980

[54] METHOD FOR CONTROLLING THE ROTATIONAL SPEED OF A ROTARY BODY

[75] Inventors: Takuro Yamada, Kyoto; Yasuo Katsumi, Kameoka; Shoei Matsuda, Otsu, all of Japan

[73] Assignee: Ito & Okamoto, Esq., Tokyo, Japan

[21] Appl. No.: 920,355

[22] Filed: Jun. 29, 1978

Related U.S. Application Data

[63] Continuation-in-part of Ser. No. 787,940, Apr. 15, 1977, abandoned.

[51] Int. Cl.$^2$ ............................................. B24B 1/00
[52] U.S. Cl. .............................. 51/281 C; 51/105 EC; 51/165.77
[58] Field of Search .......... 51/101 R, 105 R, 105 EC, 51/165 R, 165.89, 281 R, 281 C, 165.77

[56] References Cited

U.S. PATENT DOCUMENTS

| 2,508,998 | 5/1950 | Green | 51/101 R |
| 3,693,297 | 9/1972 | Cann | 51/101 R |
| 3,916,571 | 11/1975 | Seidel | 51/101 R |

FOREIGN PATENT DOCUMENTS 1387113  3/1975  United Kingdom .................. 51/101 R Primary Examiner—Harold D. Whitehead
Attorney, Agent, or Firm—Wenderoth, Lind & Ponack

[57] ABSTRACT

A method for controlling the rotational speed of a rotary body in which drive means for driving the rotary body is actuated on the basis of predetermined step-like speed command values corresponding to rotational angles of said rotary body. At transition points between said step-like speed command values are preset one or more intermediate speed command values so that the rotary body will change its rotational speed smoothly.

2 Claims, 13 Drawing Figures

METHOD FOR CONTROLLING THE ROTATIONAL SPEED OF A ROTARY BODY

This application is a continuation-in-part of Ser. No. 787,940, now abandoned filed Apr. 15, 1977.

The present invention relates to a method for controlling the rotational speed of a rotary body such as a cam or the like on the basis of step-like speed command values corresponding to angular positions within one revolution of the rotary body in a rotary machine such as a cam grinding machine or the like.

BACKGROUND OF THE INVENTION AND PRIOR ART

In general, a cam grinding machine has a basic shortcoming that since the shape of the cam to be machined is non-circular, the precision of the shaping of the cam by grinding is difficult to attain and also the time required to grind the cam is very long. In order to overcome this shortcoming, a method has been proposed in copending Japanese patent application No. 50-56001 filed Nov. 19, 1976, in which an output signal is generated for every rotational increment corresponding to a predetermined angle of a cam, predetermined step-like speed command values are generated in response to these output signals, and drive means for driving said cam is controlled on the basis of said step-like speed command values. More particularly, according to this control method, when a cam 1 (the workpiece to be ground) is ground by a grindstone 2, which is rotated at a constant speed in the direction shown in FIG. 1, while the circumferential speed $V_p$ at the contact point P between the cam 1 and the grindstone 2 changes as a function of the rotational angular position $\phi$ of the cam 1 as shown in FIG. 2, if step-like speed command values $V_{I1}$-$V_{I4}$ that correspond to the peripheral speeds $V_p$ but opposite in sense to the speed $V_p$ are preset as shown in FIG. 3, then by controlling the drive means for the rotary body on the basis of these speed command values, the rotational speed $V_R$ of the cam is changed as shown in FIG. 4. As a result, the circumferential speed $V_p$ at the contact point P between the cam 1 and the grindstone 2 becomes substantially constant as shown in FIG. 5, and the grinding of the cam 1 can be achieved in a short period of time and also with a high precision.

However, at the transition points A', B', C' and D' of the speed command values as illustrated in FIG. 4., as shown on an enlarged scale for the points A' and B', for example in FIG. 6, the rotational speed of the cam 1 changes abruptly, resulting in an impact force being exerted on the cam 1, and due to this impact force, an abnormal force is exerted upon the cam 1 or the power transmission system, so that the precision with which the cam 1 is ground is reduced and the life of the power transmission system may be shortened.

OBJECT AND BRIEF SUMMARY OF THE INVENTION

The present invention has as its object to provide a method which overcomes the drawbacks of the previously proposed method for controlling the rotational speed of a rotary body and in which impacts exerted upon the rotary body at the time of a speed change thereof can be mitigated or eliminated by smoothly changing the rotational speed of the rotary body.

This object is achieved by the method of the present invention in which the rotational speed of a rotary body is controlled by actuating drive means for driving said rotary body on the basis of predetermined step-like speed command values corresponding to rotational angles of said rotary body, and in which at the transition points between said step-like speed command values are provided one or more intermediate speed command values so that said rotary body changes its rotational speed smoothly.

BRIEF DESCRIPTION OF THE DRAWINGS

Other and further objects will become apparent from the following detailed description of the invention, taken with the accompanying drawings, in which:

FIG. 10b is a graph showing the variations in the rotational speed corresponding to the speed command values in FIG. 10a;

FIG. 11b is a graph showing the variations in the rotational speed corresponding to the speed command values in FIG. 11a.

DETAILED DESCRIPTION OF THE INVENTION

Figure 7:
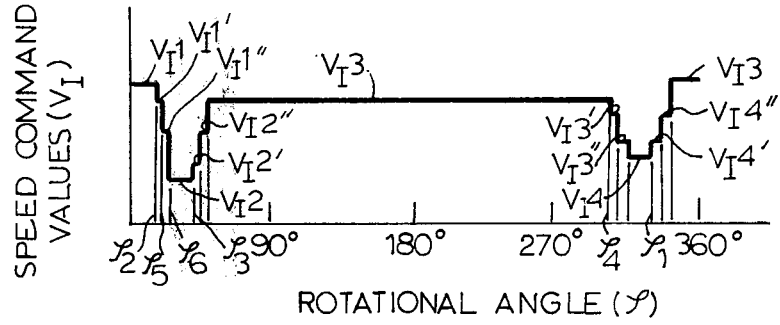
FIG. 7 is a graph showing step-like speed command values based on the circumferential speed changes shown in FIG. 2 for one preferred embodiment of the method of the present invention.
Figure 8:
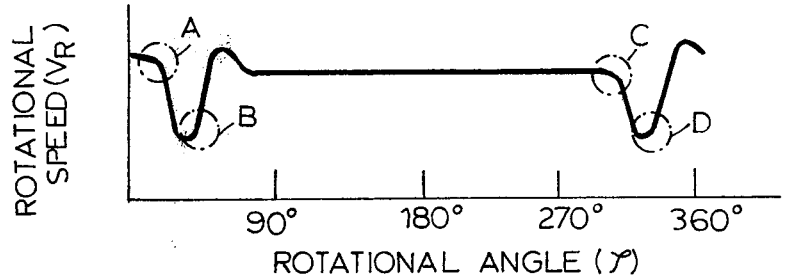
FIG. 8 is a graph showing the rotational speed of a cam which rotates on the basis of the speed command values shown in FIG. 7.
Figure 9:
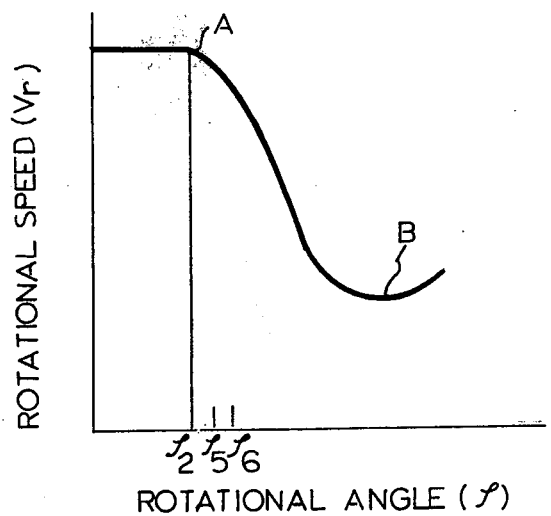
FIG. 9 is a graph, on an enlarged scale, of the portion A of the curve in FIG. 8.

With reference to FIGS. 7 to 9, in order to drive a rotary body such as a cam by a drive means such as a servo motor, the rotational angular position of the rotary body 1 with reference to a starting position is first detected. This rotational angular position detection is carried out, for instance, by connecting a pulse encoder to the rotary body 1 either directly or via mechanical coupling means such as gears, belts, etc. so as to make the pulse encoder generate a pulse for every increment of a predetermined angle through which the rotary body rotates, and counting the pulses by means of a counter. Alternatively, the rotational angular position can be detected by measuring with a timer the time the body rotates at a particular speed. Subsequently, at particular predetermined rotational angular positions, predetermined step-like speed command values are generated. The means for obtaining these step-like speed command values can be any means such as a resistor, a potentiometer or a combination of a logic circuit and a D/A converter. As to the value of these step-like speed command values, the object is to preserve a constant circumferential speed $V_p$ at the contact point P between cam 1 and grindstone 2. Thus the command speed must be least generally in the region of the largest diameter of cam 1 and greatest in the region of smallest diameter. Thus preset speed command values $V_{I1}$, $V_{I2}$, $V_{I3}$ and $V_{I4}$ are generated at the respective rotational angular position ranges $\phi_1-\phi_2$, $\phi_2-\phi_3$, $\phi_3-\phi_4$ and $\phi_4-\phi_1$ based on the respective diameters of cam 1 at these rotational angular position ranges. These preset speed command values $V_{I1}$, $V_{I2}$, $V_{I3}$ and $V_{I4}$ represent generally the respective local minimum and maximum command speed values needed to achieve a constant circumferential speed $V_p$ for the particular cam and serve as the starting points for the method of the present invention. As shown in FIG. 7, when the speed command value changes from $V_{I1}$ to $V_{I2}$ intermediate speed command values $V_{I1}'$ and $V_{I1}''$ are generated, when the speed command value changes from $V_{I2}$ to $V_{I3}$ intermediate speed command values $V_{I2}'$ and $V_{I2}''$ are generated, when the speed command value changes from $V_{I3}$ to $V_{I4}$, intermediate speed command values $V_{I3}'$ and $V_{I3}''$ are generated and when the command speed value changes from $V_{I4}$ to $V_{I1}$ intermediate speed command values $V_{I4}'$ and $V_{I4}''$ are generated. The intermediate preset speed command values $V_{I1}'$, $V_{I1}''$, $V_{I2}'$, $V_{I2}''$, $V_{I3}'$, $V_{I3}''$, $V_{I4}'$ and $V_{I4}''$ may be produced and applied in the same manner as the preset speed command values $V_{I1}$, $V_{I2}$, $V_{I3}$, and $V_{I4}$. It will be clearly understood by those skilled in the art that the drive means for the rotary body has a nonzero response time, that is a period time must elapse from the application of a new speed command value and the drive means realization of the commanded rotational speed. In this case, the intervals between the respective intermediate speed command values such as, for example, $\phi_2-\phi_5$ and $\phi_5-\phi_6$ shown in FIG. 7 are desirably somewhat shorter than the response time (with respect to the rotational angle $\phi$) of the drive means for the rotary body, and, for instance, a rotational angle interval of about 5°-10° is favorable. In addition, although the preset values and the number of settings of the intermediate speed command values are not specifically limited, it is necessary to preset the values taking into consideration the response time characteristics of the drive means for the rotary body and the differences between the step-like speed command values so that the drive means for the rotary body can change its rotational speed smoothly.

Figure 3:
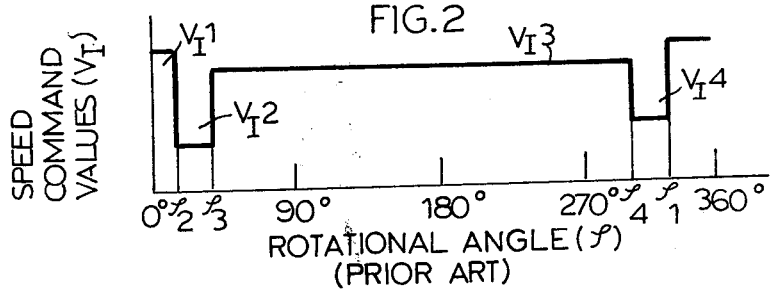
FIG. 3 is a graph showing the prior art step-like speed command values based on the circumferential speed variations shown in FIG. 2.
Figure 4:
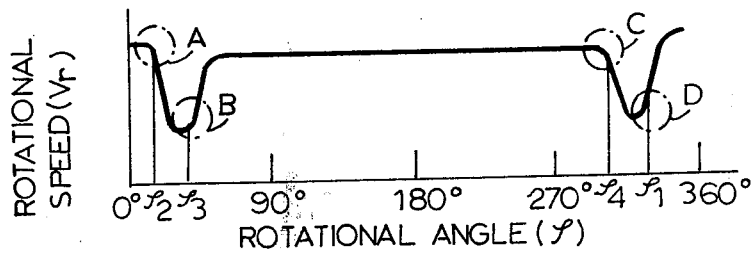
FIG. 4 is a graph showing the rotational speed of a cam which rotates on the basis of the speed command values shown in FIG. 3.
Figure 5:
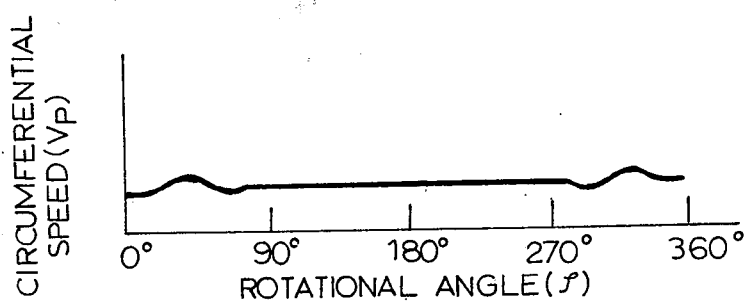
FIG. 5 is a graph showing the circumferential speed at the contact point between the cam rotating on the basis of the speed command values in FIG. 3 and the grindstone.
Figure 6:
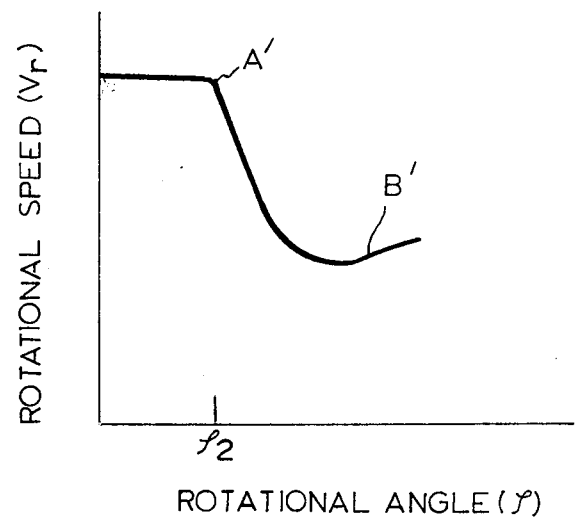
FIG. 6 is a graph, on an enlarged scale, or the portion A' of the curve in FIG. 4.

FIGS. 3 to 6 illustrate the case of a workpiece driven by the means of the prior art. The relationship between the rotational angle and the command speed value applied to the drive means for the workpiece is illustrated in FIG. 3. The actual rotational speed achieved is illustrated in FIG. 4. FIG. 5 illustrates the circumferential speed between cam 1 and grindstone 2 showing the substantial smoothing of this function achieved by the method of the prior art. FIG. 6 is an enlarged illustration of the actual rotational speed versus rotational angle in the region of $\phi_2$ (A in FIG. 4). As previously described this curve has an abrupt change at A'. This abrupt change of speed corresponds to a high acceleration of cam 1 and the drive means. This high acceleration places abnormal forces on the workpiece and the drive means leading to inaccurate machining of the workpiece and shortened life for the drive means.

FIGS. 7 to 9 illustrate the case of a workpiece driven according to the method of this invention. FIG. 7 illustrates the relationship between the speed command values and the rotational angle including the intermediate speed command values of $V_{I1}'$, $V_{I1}''$, $V_{I2}'$, $V_{I2}''$, $V_{I3}'$, $V_{I3}''$, $V_{I4}'$ and $V_{I4}''$. According to the present invention the value and duration of these intermediate speed control values are chosen with regard to the response time of the drive means so that the acutal rotational speed cannot follow the command speed values accurately. The relationship between the actual rotational speed and rotational angle is illustrated in FIG. 8. FIG. 9 is an enlarged illustration of the actual rotational speed versus rotational angle in the region of $\phi_2$ (A of FIG. 8). As can be clearly seen at A of FIG. 9, the speed change is less abrupt than that of the prior art method illustrated in FIG. 6. This reduced acceleration at the starting point of the transition between the command speed value of $V_{I1}$ and the command speed value of $V_{I2}$ causes reduced forces on the workpiece and the drive means than that caused by the method of the prior art. As a result of these reduced forces the method of the present invention achieves greater accuracy in machining the workpiece and longer life for the drive means than the prior art.

The present invention is based upon the discovery that when a speed command value is stepwisely changed, for example, from a speed command value $V_{I1}$ to another speed command value $V_{I2}$ as shown in FIG. 7, an inevitable abrupt acceleration occurs at the starting point of the speed change (at point A' in FIG. 6). The speed change at the starting point can be made smoother (point A in FIG. 9) by presetting intermediate speed command values $V_{I1}'$ and $V_{I1}''$ between the speed command values $V_{I1}$ and $V_{I2}$, each of these intermediate speed command values sustained for a short interval which is desirably somewhat shorter than the response time of the drive means. This invention is directed to the particular relationships between the preset speed command values and the intermediate speed command values, and therefor, we have not described the selection of particular intermediate speed command values which those skilled in the art can determine depending on the specific driving means being employed.

In this invention, the nature of the intermediate speed command values is important. It is quite unnecessary for the actual rotational speed to follow the intermediate speed command value exactly, but on the contrary it is only necessary for the actual rotational speed to eventually reach the final speed command value $V_{I2}$. In practice, the interval during which the intermediate speed command value $V_{I1}'$ or $V_{I1}''$ is supplied, is so short in relation to the response time of the drive means that the actual rotational speed cannot follow that intermediate speed command value. However, in relation to the speed change at the starting point (point A' in FIG. 6 and point A in FIG. 9), it will be readily seen that the speed change when the intermediate speed command values are preset (illustrated in FIG. 9) is far smoother than the speed change when the intermediate speed command values are not employed (illustrated in FIG. 6).

Now one practical example of carrying out the control method according to the present invention will be described as compared to a control method according to the previously proposed method.

Figure 1:
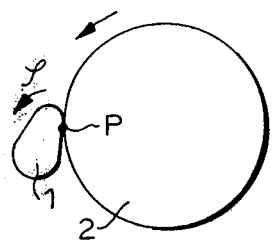
FIG. 1 is a diagrammatic view showing the method of grinding a cam which constitutes a rotary body.
Figure 2:
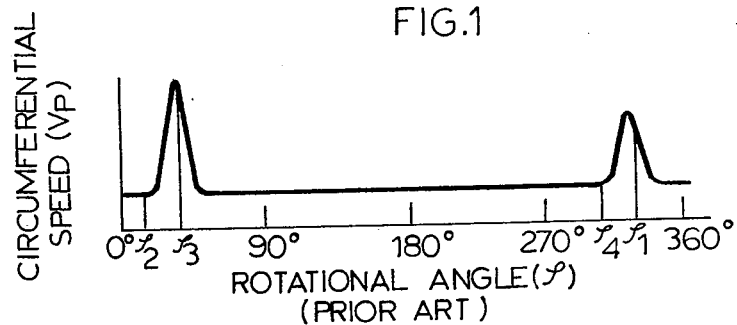
FIG. 2 is a graph showing the variation of the circumferential speed at the contact point between the cam and the grindstone at respective rotational angular positions where the cam is rotated at a constant speed.
Figure 10A:
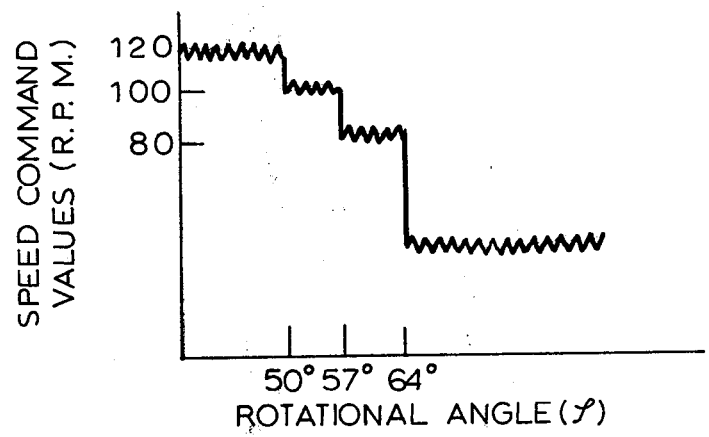
FIG. 10a is a graph showing experimental speed command values for one experiment according to the method of the present invention.
Figure 10B:
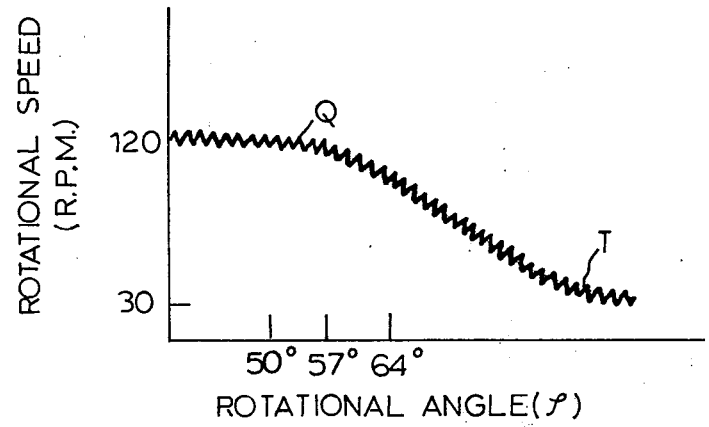

The rotational speed of a cam as shown in FIG. 1 was changed, starting at a rotational angular position of 50°, from 120 r.p.m. to 30 r.p.m., as shown in FIG. 10a. Intermediate speed command values were preset so that a speed command value of 100 r.p.m. was used in a rotational angular position range of 50°–57° and 80 r.p.m. was used in the rotational angular position range of 57°–64°, and beyond 64°, 30 r.p.m. was used. As a result of the speed control for a cam on the basis of these speed command values, the rotational speed was changed smoothly without abrupt changes as shown in FIG. 10b. In addition, the time period (T-Q) in which the rotational speed changed from 120 r.p.m. to 30 r.p.m. was checked and it proved to be 0.06 seconds.

Figure 11A:
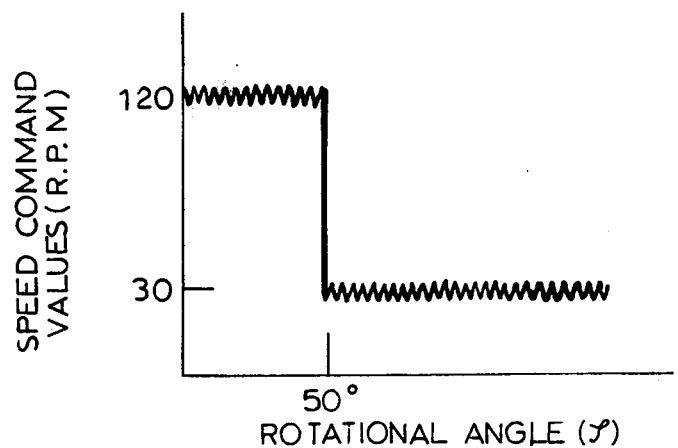
FIG. 11a is a graph showing experimental speed command values for a prior art method which was conducted as a contrast to the experiment shown in FIGS. 10a and 10b.
Figure 11B:
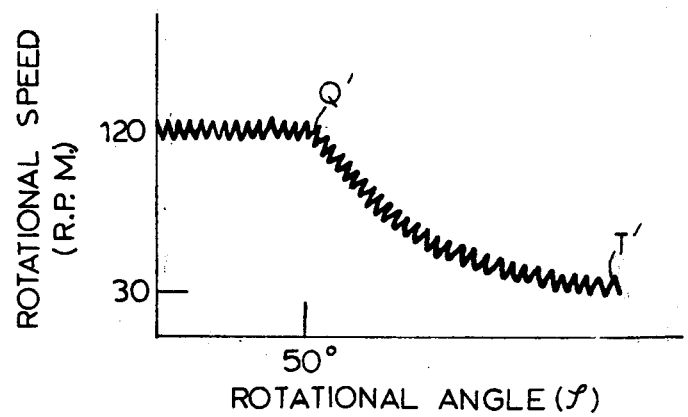

Using the control method of the prior art, the speed command values were preset so that they changed at the rotational angular position of 50° from 120 r.p.m. directly to 30 r.p.m. without any intermediate speed command values, as shown in FIG. 11a. In contrast to the abovedescribed example, the rotational speed changed abruptly as shown in FIG. 11b. The time period (T'-Q') required for the rotational speed to change from 120 r.p.m. to 30 r.p.m. was 0.055 seconds. Thus it was confirmed that with respect to the time required before a predetermined stationary speed was attained, the method according to the present invention differed little from the prior art method.

An essential feature of the present invention is the relationship between the intermediate speed command values and the response time of the driving means. As can be clearly seen by comparison of FIGS. 11a and 11b, the response time of the driving means is a great deal longer than the changes in speed command value according to the prior art. The sudden large change in speed command value causes the large acceleration observed at Q' of FIG. 11b without increasing the response time of the driving means. According to the present invention, the intermediate speed command values also change more rapidly than the response time of the driving means. However, since the difference between the actual rotational speed and the intermediate speed command value according to the present invention is less than the difference between the actual rotational speed and the speed command value according to the prior art, the starting point acceleration is reduced (see Q of FIG. 10a). At the same time the rapidity of the change in actual rotational speed is still limited by the response time of the driving means. Thus as shown in the examples illustrated in FIGS. 10 and 11, the actual response time from one preset speed command value to the next is not significantly degraded using the method of the present invention.

As will be apparent from the above-described results, according to the present invention, when a rotary body such as a cam is driven in rotation with one or more intermediate preset speed command values provided at speed change points in a step-like manner, the excessive accelerations ordinarily sustained by the equipment at the speed change points can be reduced or eliminated by smoothly carrying out the speed change, so that excellent effects and advantages are realized in that the precision with which a cam or the like can be ground is enhanced and also the life of a power transmission system can be extended.

What is claimed is:

1. In a method for controlling the rotational speed of a rotary body in which the drive means for rotatably driving the body is actuated on the basis of predetermined step-like speed command values at predetermined rotational angular positions of the body, the drive means having a nonzero response time between the application of a new speed command value and the realization of the commanded rotational speed, the improvement comprising supplying to the drive means at each transition point between the predetermined step-like speed command values of the rotary body at least one intermediate speed command value for driving said rotary body at a speed intermediate the predetermined step-like speed command values before and after the speed change carried out at the transition point, each intermediate speed command value being supplied to the drive means for a period for causing the transition between the predetermined step-like speed command values to be shorter than the response time of the drive means.

2. The improvement as claimed in claim 1 in which a plurality of intermediate speed command values are supplied to the drive means at each transition point.

* * * * *